United States Patent
Ishikawa et al.

(10) Patent No.: US 10,189,942 B2
(45) Date of Patent: Jan. 29, 2019

(54) POLYORGANOSILOXANE, POLYCARBONATE-POLYORGANO-SILOXANE COPOLYMER, AND PRODUCTION METHOD THEREFOR

(71) Applicant: IDEMITSU KOSAN CO., LTD., Tokyo (JP)

(72) Inventors: Yasuhiro Ishikawa, Ichihara (JP); Tomoko Abe, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/300,694

(22) PCT Filed: Dec. 12, 2014

(86) PCT No.: PCT/JP2014/083055
§ 371 (c)(1),
(2) Date: Sep. 29, 2016

(87) PCT Pub. No.: WO2015/151346
PCT Pub. Date: Oct. 8, 2015

(65) Prior Publication Data
US 2017/0114184 A1    Apr. 27, 2017

(30) Foreign Application Priority Data

Mar. 31, 2014  (JP) ................. 2014-073411

(51) Int. Cl.
| | |
|---|---|
| *C08G 64/18* | (2006.01) |
| *C08L 83/10* | (2006.01) |
| *C08G 77/38* | (2006.01) |
| *C08G 77/448* | (2006.01) |
| *C08G 77/20* | (2006.01) |

(52) U.S. Cl.
CPC .......... *C08G 64/186* (2013.01); *C08G 77/38* (2013.01); *C08L 83/10* (2013.01); *C08G 77/20* (2013.01); *C08G 77/448* (2013.01); *C08G 2105/00* (2013.01)

(58) Field of Classification Search
CPC .................................................. C08G 77/448
See application file for complete search history.

(56) References Cited

U.S. PATENT DOCUMENTS

| | | | |
|---|---|---|---|
| 2003/0027928 A1 | 2/2003 | Okamoto et al. | |
| 2004/0030044 A1 | 2/2004 | Okamoto et al. | |

FOREIGN PATENT DOCUMENTS

| | | | |
|---|---|---|---|
| EP | 1 331 246 A1 | | 7/2003 |
| JP | H05-043699 A | | 2/1993 |
| JP | 11143277 | * | 5/1999 |
| JP | 2001-072846 A | | 3/2001 |
| JP | 2002-146194 A | | 5/2002 |
| JP | 2007-510795 A | | 4/2007 |
| JP | 2011-021127 A | | 2/2011 |
| JP | 2011032433 | * | 2/2011 |
| JP | 2011-046911 A | | 3/2011 |
| JP | 2011-046913 A | | 3/2011 |
| JP | 2011-122048 A | | 6/2011 |
| JP | 2012-153824 A | | 8/2012 |
| JP | 2012-246430 A | | 12/2012 |
| TW | 570954 B | | 1/2004 |

OTHER PUBLICATIONS

JP 11 143277 translation (1999).*
JP 2011 032433 Translation (2011).*
"Plastics—Determination of Yellowness Index and Change of Yellowness Index", Plastics I (Test)(JISK7373), JIS Handbook 26, Japanese Standards Association, Jan. 30, 2008, pp. 859-866.
"Silicon Oil", Catalogue of Momentive Performance Materials Japan, LLC, Nov. 1969/Revised in Jul. 2007.
Information Offer Form 1 issued by the Japanese Patent Office in JP patent application No. 2014-073411, dated Oct. 25, 2017.
Information Offer Form 2 issued by the Japanese Patent Office in JP patent application No. 2014-073411, dated Oct. 25, 2017.
Extended European Search Report dated Jul. 28, 2017 in European Patent Application No. 14888450.5.
International Search Report issued in International Patent Application No. PCT/JP2014/083055 dated Jan. 13, 2015.
Japanese Information Offer Form dated Apr. 24, 2018 in corresponding application No. 2014-073411.
Taiwanese Office Action dated Jul. 13, 2018 in corresponding application No. 104100091.
The State Intellectual Property of People's Republic of China, "First Office Action," issued in connection with Chinese Patent Application No. 201480077736.7, dated Nov. 23, 2018.

* cited by examiner

*Primary Examiner* — Kuo Liang Peng
(74) *Attorney, Agent, or Firm* — Foley & Lardner LLP

(57) ABSTRACT

Provided is a polyorganosiloxane, wherein a value obtained by integrating dw/d log(M) from 2.5≤log(M)≤3.1 is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

5 Claims, 1 Drawing Sheet

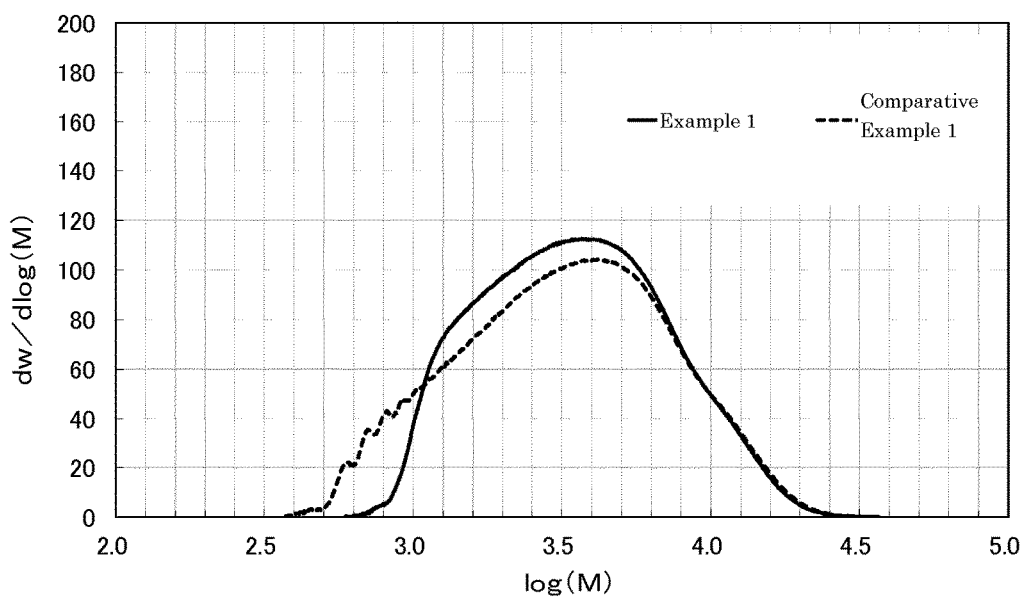

POLYORGANOSILOXANE, POLYCARBONATE-POLYORGANOSILOXANE COPOLYMER, AND PRODUCTION METHOD THEREFOR

CROSS-REFERENCE TO RELATED APPLICATIONS

The present application is a U.S. national stage application of International Patent Application No. PCT/JP2014/083055, filed Dec. 12, 2014, which claims the benefit of priority to Japanese Patent Application No. 2014-073411, filed Mar. 31, 2014, the entireties of which are hereby incorporated by reference.

TECHNICAL FIELD

The present invention relates to a polyorganosiloxane, a polycarbonate-polyorganosiloxane copolymer with which a molded polycarbonate article having low yellowness can be obtained without impairing transparency and low-temperature impact resistance, and a method for producing the copolymer.

BACKGROUND ART

A polycarbonate-polyorganosiloxane copolymer (hereinafter sometimes abbreviated as "PC-POS") has been expected to be widely used in various fields such as the field of electrical and electronic equipment and the field of automobiles because of its high impact resistance, chemical resistance, flame retardancy, and so forth. In particular, the use of the PC-POS has been expanding in housings for a cellular phone, a smart phone, a mobile personal computer, a tablet, a portable remote terminal, and the like; in an illumination cover and a construction material; in housings for electronic equipment which require visibility such as a digital camera and a video camera; in protective equipment such as a police shield, a helmet visor, and a sport protective equipment, and in other commodities. These are expected to be used not only in usual conditions such as at room temperature but also at low temperature such as in a cold district as well as in an outdoor environment.

A homopolycarbonate whose raw material is 2,2-bis(4-hydroxyphenyl)propane [common name: bisphenol A] has been generally used. A polycarbonate-polyorganosiloxane copolymer using a polyorganosiloxane as a copolymerizable monomer has been known for improving the physical properties of the homopolycarbonate such as flame retardancy and impact resistance. It has been known that the polycarbonate-polyorganosiloxane copolymer has higher flame retardancy and impact resistance as compared with the homopolycarbonates made with bisphenol A and the like (Patent Document 1).

In Patent Document 2, a polycarbonate-polyorganosiloxane copolymer whose transparency is improved is disclosed, wherein a total light transmittance, a Haze value, and the like are evaluated.

In Patent Document 3, a polycarbonate-polyorganosiloxane copolymer whose color tone is improved is disclosed. In Patent Document 3, it is taught that by decreasing content of a certain component in the polycarbonate-polyorganosiloxane copolymer, not only excellent heat stability can be obtained but also color difference due to residence time at the time of injection molding can be made smaller.

CITATION LIST

Patent Document

[Patent Document 1] JP 2012-246430 A
[Patent Document 2] JP 2011-46911 A
[Patent Document 3] JP 2011-122048 A

SUMMARY OF INVENTION

Technical Problem

However, in the above Patent Documents, yellowness of the polycarbonate-polyorganosiloxane copolymer itself has not been mentioned. Even if transparency of the polycarbonate-polyorganosiloxane copolymer is excellent, if yellowness of the copolymer itself is not decreased, this can become a problem in the uses such as an illumination cover as well as the uses which require high visibility such as an instrument panel, a helmet visor, and a police shield.

The present invention has an object to provide a polycarbonate-polyorganosiloxane copolymer which has excellent transparency and low yellowness without deteriorating mechanical properties thereof.

Solution to Problem

The inventors of the present invention have found that the above problem can be solved by controlling the molecular weight distribution of a polyorganosiloxane to be used in a polycarbonate-polyorganosiloxane copolymer.

That is, the present invention relates to the following aspects of 1 to 11.

1. A polyorganosiloxane,
wherein a value obtained by integrating dw/d log(M) from 2.5≤log(M)≤3.1 is 0 to 10% of a value obtained by integrating dw/d log(M) over the entire range of log (M) in a differential molecular weight distribution curve,
wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

2. The polyorganosiloxane according to 1, wherein the dw/d log(M) value becomes maximum in the range of 3.3≤log(M)≤3.9, in the differential molecular weight distribution curve.

3. The polyorganosiloxane according to 1 or 2, wherein an average chain length thereof is in the range of 20 to 50.

4. The polyorganosiloxane according to any one of 1 to 3, wherein the polyorganosiloxane is a polyorganosiloxane represented by the following general formula (1) or (2).

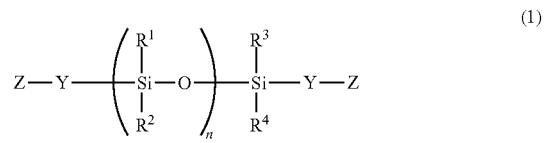

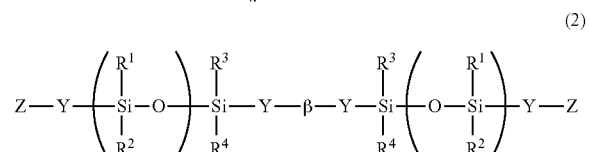

wherein, $R^1$ to $R^4$ each independently represents a hydrogen atom, a halogen atom, an alkyl group having 1 to 6 carbon atoms, an alkoxy group having 1 to 6 carbon atoms, or an aryl group having 6 to 12 carbon atoms: Y represents —$R^5$O—, —$R^5$COO—, —$R^5$NH—, —$R^5$N$R^6$—, —COO—, —S—, —$R^5$COO—$R^7$—O—, or —$R^5$O—$R^8$—O—; $R^5$ represents a single bond, a linear, branched, or cyclic alkylene group, an aryl-substituted alkylene group, an arylene group, or a diarylene group; $R^6$ represents an alkyl group, an alkenyl group, an aryl group, or an aralkyl group; $R^7$ represents a diarylene group; $R^8$ represents a linear, branched, or cyclic alkylene group, or a diarylene group; Z represents a hydrogen atom or a halogen atom; β represents a divalent group derived from a diisocyanate compound, or a divalent group derived from a dicarboxylic acid or a halogenated dicarboxylic acid; a sum of p and q is n; and n represents an average repeat number in the range of 20 to 50.

5. A method for producing a polycarbonate-polyorganosiloxane copolymer, wherein the polyorganosiloxane according to any one of 1 to 4 is used as a raw material thereof.

6. A polycarbonate-polyorganosiloxane copolymer, comprising: a polycarbonate block (A) comprising a repeating unit represented by the following general formula (I); and a polyorganosiloxane block (B) comprising a repeating unit represented by the following general formula (II), wherein the polyorganosiloxane block (B) has a value obtained by integrating dw/d log(M) from 2.5≤log(M)≤3.1 is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

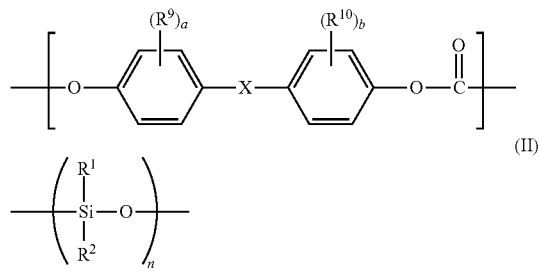

wherein, $R^9$ and $R^{10}$ each independently represents a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; and a and b each independently represents an integer of 0 to 4, $R^1$ and $R^2$ each independently represents a hydrogen atom, a halogen atom, an alkyl group having 1 to 6 carbon atoms, an alkoxy group having 1 to 6 carbon atoms, or an aryl group having 6 to 12 carbon atoms; an average repeat number n in the range of 20 to 50 represents a sum of siloxane repeating units in the polyorganosiloxane block.

7. The polycarbonate-polyorganosiloxane copolymer according to 6, wherein the dw/d log(M) value becomes maximum in the range of 3.3≤log(M)≤3.9 in the differential molecular weight distribution curve of the polyorganosiloxane block (B).

8. The polycarbonate-polyorganosiloxane copolymer according to 6 or 7, wherein an average chain length of the polyorganosiloxane block (B) is in the range of 20 to 50.

9. The polycarbonate-polyorganosiloxane copolymer according to any one of 6 to 8, wherein content of the polyorganosiloxane block (B) in the polycarbonate-polyorganosiloxane copolymer is in the range of 0.5 to 20% by mass.

10. The polycarbonate-polyorganosiloxane copolymer according to anyone of 6 to 9, wherein a viscosity-average molecular weight thereof is in the range of 12,000 to 40,000.

11. A molded article, which is obtained by molding the polycarbonate-polyorganosiloxane copolymer according to any one of 6 to 10.

Advantageous Effects of the Invention

According to the present invention, a polycarbonate-polyorganosiloxane copolymer which has excellent transparency and low yellowness can be obtained without deteriorating mechanical strength by controlling a molecular weight distribution of a polyorganosiloxane as well as by controlling a chain length distribution thereof.

BRIEF DESCRIPTION OF DRAWINGS

FIG. 1 is a graph showing the differential molecular weight distribution curves of the polyorganosiloxanes obtained in Example 1 and Comparative Example 1.

DESCRIPTION OF EMBODIMENTS

The polyorganosiloxane of the present invention is characterized in which a value obtained by integrating dw/d log(M) from 2.5≤log(M)≤3.1 is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

In the present invention, in the differential molecular weight distribution curve, the value obtained by integrating dw/d log(M) from 2.5≤log(M)≤3.1 is 0 to 10%, more preferably 0 to 9% of a value obtained by integrating dw/d log(M) over the entire range of log (M) in a differential molecular weight distribution curve. If the ratio becomes more than 10%, the polyorganosiloxane-polycarbonate copolymer tends to increase in its yellowness. It should be noted that the value obtained by integrating a dw/d log(M) from of 2.5≤log(M)≤3.1 of a value obtained by integrating a dw/d log(M) value over the entire range of the log (M) means, in the molecular weight distribution of the polyorganosiloxane, the existing ratio of a component having log (M) in the range of 2.5 to 3.1 to the entirety of the polyorganosiloxane.

A GPC apparatus for obtaining the measured values of the molecular weight and molecular weight distribution of the polyorganosiloxane is not particularly limited, and a high-temperature-type GPC apparatus that is generally on the market such as a high-temperature-type GPC measuring apparatus with an internal refractive index (RI) detector "HLC-8200" manufactured by Tosoh Corporation may be used. In particular, a column obtained by connecting "TSK-GEL G4000HXL" and "TSK-GEL G2000HXL", the both being manufactured by Tosoh Corporation, is used as a GPC column. A column temperature is set at 40° C., tetrahydrofuran (THF) is used as an eluent, and the measurement is made at a flow rate of 1.0 mL/min. A standard polystyrene manufactured by Tosoh Corporation is used to obtain a calibration curve thereof. The logarithmic value of a molecular weight thus obtained is referred to as "logarithmic molecular weight (log (M))."

In the time curve of an intensity distribution detected with the refractive index (RI) detector of the GPC apparatus (generally referred to as "elution curve"), an elution time is converted into a molecular weight by using the calibration curve obtained from the substance having a known molecular weight. Here, the intensity detected with the RI is in proportion to a component concentration, and hence a concentration fraction at each elution time is determined by determining an intensity area when the total area of the elution curve is set to 100%. An integral molecular weight distribution curve can be obtained by sequentially integrating concentration fraction, and plotting the logarithmic value of the molecular weight (log(M)) along an x-axis and the integrated value of the concentration fraction (w) along a y-axis.

Subsequently, a differential molecular weight distribution curve can be obtained by determining the differential value of the curve at each logarithmic value of the molecular weight (i.e., the gradient of the integral molecular weight distribution curve), and plotting the logarithmic value of the molecular weight (log(M)) along an x-axis and the differential value (dw/d log(M)) along a y-axis. Therefore, the differential molecular weight distribution means a value obtained by differentiating the concentration fraction (w) with respect to the logarithmic value of the molecular weight (log(M)), i.e., "dw/d log(M)". The differential molecular weight distribution dw/d log(M) at a specific log(M) can be read from the differential molecular weight distribution curve. It should be noted that in the case of a polyorganosiloxane blend obtained by blending a plurality of polyorganosiloxanes as well, the differential molecular weight distribution curve can be obtained by the same approach after the measurement of the polyorganosiloxane blend by a GPC method.

In another embodiment of the present invention, the polyorganosiloxane can take a maximum value when the dw/d log(M) value is in the range of 3.3≤log(M)≤3.9. The maximum value of the differential molecular weight distribution dw/d log(M) refers to a peak top in the differential molecular weight distribution curve. If log (M) at the time when the dw/d log(M) value in the differential molecular weight distribution curve is maximum is less than 3.3, a poor low-temperature impact resistance of the polyorganosiloxane-polycarbonate copolymer is resulted; and if the value thereof is more than 3.9, transparency of the copolymer tends to decrease.

The average chain length of the polyorganosiloxane is preferably in the range of 20 to 50, more preferably in the range of 30 to 45, while still more preferably in the range of 35 to 45. The average chain length thereof is calculated by a nuclear magnetic resonance (NMR) measurement. If the average chain length is 20 or more, a sufficiently high impact resistance at low temperature can be obtained. In addition, if the average chain length is 50 or less, the polyorganosiloxane-polycarbonate copolymer having excellent transparency can be obtained.

As to the polyorganosiloxane having the above-mentioned characteristics, for example, the polyorganosiloxane shown by the following general formulae (1) and (2) may be mentioned.

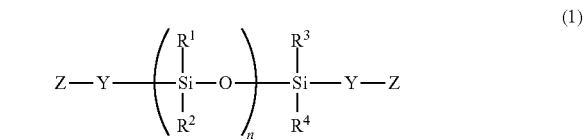

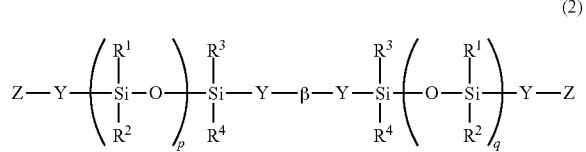

wherein, $R^1$ to $R^4$ each independently represents a hydrogen atom, a halogen atom, an alkyl group having 1 to 6 carbon atoms, an alkoxy group having 1 to 6 carbon atoms, or an aryl group having 6 to 12 carbon atoms: Y represents —$R^5$O—, —$R^5$COO—, —$R^5$NH—, —$R^5$NR$^6$—, —COO—, —S—, —$R^5$COO—$R^7$—O—, or —$R^5$O—$R^8$—O—; $R^5$ represents a single bond, a linear, branched, or cyclic alkylene group, an aryl-substituted alkylene group, an arylene group, or a diarylene group; $R^6$ represents an alkyl group, an alkenyl group, an aryl group, or an aralkyl group; $R^7$ represents a diarylene group; $R^8$ represents a linear, branched, or cyclic alkylene group, or a diarylene group; Z represents a hydrogen atom or a halogen atom; β represents a divalent group derived from a diisocyanate compound, or a divalent group derived from a dicarboxylic acid or a halogenated dicarboxylic acid; a sum of p and q is n: and n represents an average repeat number in the range of 20 to 50.

Examples of the halogen atom independently represented by $R^1$ to $R^4$ each include a fluorine atom, a chlorine atom, a bromine atom, and an iodine atom. Examples of the alkyl group independently represented by $R^1$ to $R^4$ each include a methyl group, an ethyl group, a n-propyl group, an isopropyl group, various butyl groups ("various" means that a linear group and any branched group are included, and the same applies hereinafter), various pentyl groups, and various hexyl groups. Examples of the alkoxy group independently represented by $R^1$ to $R^4$ each include an alkoxy group whose alkyl moiety is the alkyl group described above. Examples of the aryl group independently represented by $R^1$ to $R^4$ each include a phenyl group and a naphthyl group.

$R^1$ to $R^4$ each preferably represents a hydrogen atom, an alkyl group having 1 to 6 carbon atoms, an alkoxy group having 1 to 6 carbon atoms, or an aryl group having 6 to 12 carbon atoms.

In the polyorganosiloxane represented by the general formulae (1) and (2), each of $R^1$ to $R^4$ represents preferably a methyl group.

Examples of the linear or branched alkylene group represented by $R^5$ in —$R^5$O—, —$R^5$COO—, —$R^5$NH—, —$R^5$NR$^6$—, —COO—, —S—, —$R^5$COO—$R^7$—O—, or —$R^5$O—$R^8$—O— shown by Y is an alkylene group having 1 to 8 carbon atom, while preferably an alkylene group having 1 to 5 carbon atoms; and examples of the cyclic alkylene group is a cycloalkylene group having 5 to 15 carbon atom, while preferably 5 to 10 carbon atoms.

The aryl-substituted alkylene group represented by $R^5$ may contain substituent groups such as an alkoxy group or an alkyl group in the aromatic ring thereof, wherein specific structures thereof can be shown, for example, by the following general formula (3) or (4). When the aryl-substituted alkylene group is contained therein, the alkylene group is bonded to Si.

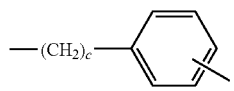
(3)

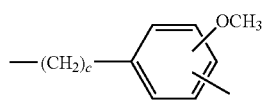
(4)

wherein c represents a positive integer and usually represents an integer of 1 to 6.

The diarylene group shown by $R^5$, $R^7$, and $R^8$ refers to the group having two arylene groups bonded directly or via a divalent organic group, and it specifically refers to a group having a structure shown by —$Ar^1$—W—$Ar^2$—. It should be noted that $Ar^1$ and $Ar^2$ represent an arylene group; and W represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—.

Examples of the alkylene group represented by W include a methylene group, an ethylene group, a trimethylene group, a tetramethylene group, and a hexamethylene group, wherein an alkylene group having 1 to 5 carbon atoms is preferable. Examples of the alkylidene group represented by W include an ethylidene group and an isopropylidene group. Examples of the cycloalkylene group represented by W include a cyclopentanediyl group, a cyclohexanediyl group, and a cyclooctanediyl group, wherein a cycloalkylene group having 5 to 10 carbon atoms is preferable. Examples of the cycloalkylidene group represented by W include a cyclohexylidene group, 3,5,5-trimethylcyclohexylidene group, and a 2-admantylidene group, wherein a cyclohexylidene group having 5 to 10 carbon atoms is preferable, while a cyclohexylidene group having 5 to 8 carbon atoms is more preferable. Examples of the aryl moiety of the arylalkylene group represented by W include an aryl group having 6 to 14 ring-forming carbon atoms, such as a phenyl group, a naphthyl group, a biphenyl group, and an anthoryl group. Examples of the aryl moiety of the arylalkylidene group represented by W include an aryl group having 6 to 14 ring-forming carbon atoms, such as a phenyl group, a naphthyl group, a biphenyl group, and an anthoryl group.

Examples of the arylene group represented by $R^5$, $Ar^1$, and $Ar^2$ include an arylene group having 6 to 14 ring-forming carbon atoms, such as a phenylene group, a naphthylene group, a biphenylene group, and an anthorylene group. These arylene groups may have an arbitrary substituent group such as an alkoxy group and an alkyl group.

Examples of the alkyl group represented by $R^6$ include a linear or branched chain having 1 to 8 carbon atoms, while preferably 1 to 5 carbon atoms. Examples of the alkenyl group is a linear or branched chain having 2 to 8 carbon atoms, while preferably 2 to 5 carbon atoms. Examples of the aryl group include a phenyl group and a naphthyl group. Examples of the aralkyl group include a phenylmethyl group and a naphthylmethyl group.

The linear, branched, or acyclic alkylene group represented by $R^8$ is the same as those of $R^5$.

Y is preferably —$R^5$O—, wherein $R^5$ is an aryl-substituted alkylene group, in particular, a phenol compound residue having an alkyl group, while more preferably an organic residue derived from an arylphenol or an organic residue derived from eugenol. In this case, Z is preferably a hydrogen atom.

It should be noted that p and q in the general formula (2) are preferably p=q, i.e., p=n/2 and q=n/2.

In addition, β represents a divalent group derived from a diisocyanate compound, or a divalent group derived from a dicarboxylic acid or a halogenated dicarboxylic acid; and examples thereof include divalent groups shown by the following general formulae (5-1) to (5-5).

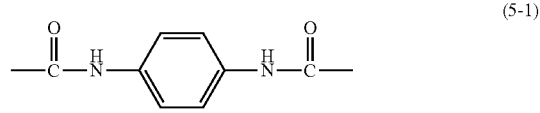
(5-1)

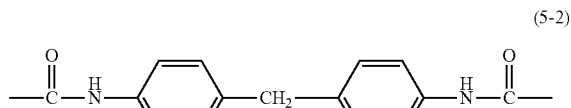
(5-2)

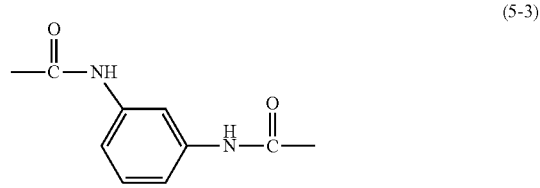
(5-3)

(5-4)

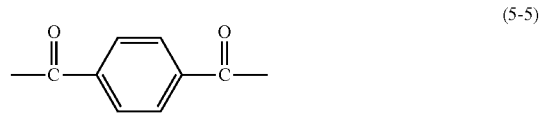
(5-5)

Examples of the polyorganosiloxane shown by the general formula (1) include the compounds shown by the following general formulae (1-1) to (1-11).

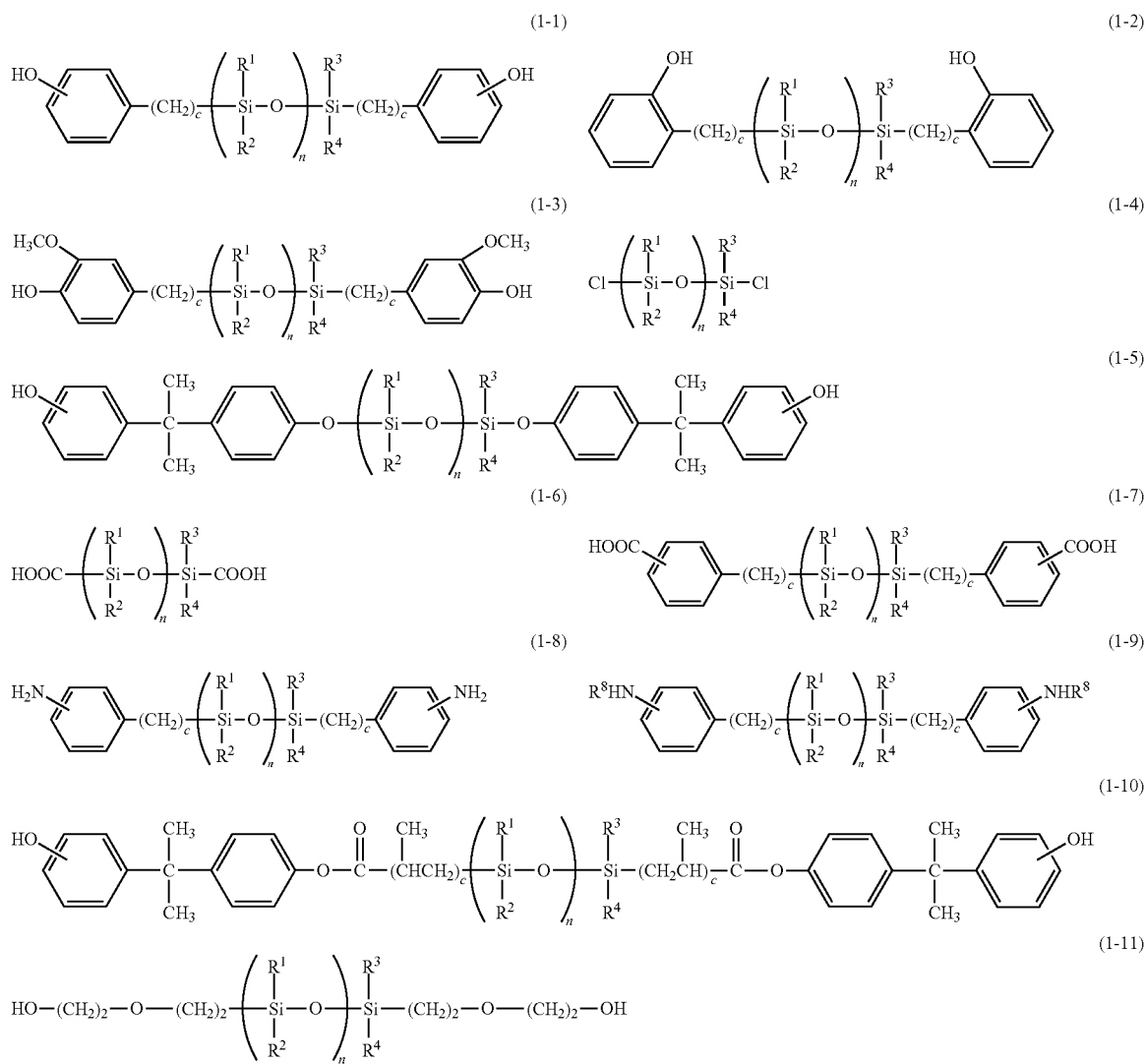

In the general formulae (1-1) to (1-11), $R^1$ to $R^4$, n, $R^6$, and $R^8$ are the same as those defined before; and the same is applied to those shown as the preferable examples thereof. In the formulae, c represents a positive integer, while usually it is an integer of 1 to 6.

Among them, in view of easiness in polymerization, a phenol-modified polyorganosiloxane shown by the general formula (1-1) is preferable. In view of availability, α,ω-bis [3-(o-hydroxyphenyl)propyl]polydimethylsiloxane, which is one kind of the compounds shown by the general formula (1-2), and α,ω-bis [3-(4-hydroxy-3-methoxyphenyl)propyl]-polydimethylsiloxane, which is one kind of the compounds shown by the general formula (1-3), are preferable.

A method of producing the crude polyorganosiloxane to be used in the present invention is not particularly limited. According to, for example, a method described in JP H11-217390 A, the crude polyorganosiloxane can be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with a phenolic compound or the like having an unsaturated group (such as 2-allylphenol, 4-allylphenol, eugenol, or 2-propenylphenol) in the presence of a catalyst for a hydrosilylation reaction. According to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with a phenolic compound or the like having an unsaturated group in the presence of the catalyst for a hydrosilylation reaction in the same manner as in the foregoing. It should be noted that the chain length n of the α,ω-dihydrogen organopolysiloxane can be appropriately adjusted depending on a polymerization condition thereof before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

It is preferable to adsorb to an adsorbent a transition metal derived from the transition metal-based catalyst used as the catalyst for a hydrosilylation reaction in the crude polyorganosiloxane by bringing the crude polyorganosiloxane into contact with the adsorbent so as to remove the transition metal.

As to the adsorbent, for example, an adsorbent having an average pore diameter of 1,000 Å or less may be used. When the average pore diameter thereof is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, while still further more preferably 100 Å or less. In addition, from the same viewpoint, the adsorbent is preferably a porous adsorbent.

The adsorbent is not particularly limited as long as the adsorbent has the above-mentioned average pore diameter. For example, there may be used activated clay, acid clay, activated carbon, a synthetic zeolite, a natural zeolite, activated alumina, silica, a silica-magnesia-based adsorbent, diatomaceous earth, and cellulose. The adsorbent is preferably at least one selected from the group consisting of activated clay, acid clay, activated carbon, a synthetic zeolite, a natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically 1 µm to 4 mm, while preferably 1 µm to 100 µm from the viewpoint of separating the adsorbent from the polyorganosiloxane after the adsorption of the transition metal.

When the adsorbent is used in the present invention, its usage amount is not particularly limited. A porous adsorbent can be used in an amount in the range of preferably 1 to 30 parts by mass, more preferably 2 to 20 parts by mass, relative to 100 parts by mass of the crude polyorganosiloxane.

When the crude polyorganosiloxane to be treated has so high a molecular weight and the crude polyorganosiloxane is not in a liquid state, the polyorganosiloxane may be heated to such a temperature as to be in a liquid state upon performance of the adsorption with the adsorbent and the separation of the adsorbent. Alternatively, the polyorganosiloxane is dissolved in a solvent such as methylene chloride or hexane, and then the adsorption and the separation may be performed.

A polyorganosiloxane having a desired molecular weight distribution is obtained by regulating its molecular weight distribution through, for example, the blending of a plurality of polyorganosiloxanes. Alternatively, a crude polyorganosiloxane having a desired molecular weight distribution can be obtained by blending a plurality of α,ω-dihydrogen organopolysiloxanes and then subjecting a phenol compound having an unsaturated group or the like to an addition reaction with the resultant in the presence of a catalyst for a hydrosilylation reaction. In addition, purification such as the removal of the catalyst for a hydrosilylation reaction may be performed after a plurality of crude polyorganosiloxanes have been blended. A plurality of polyorganosiloxanes after the purification may be blended. In addition, a molecular weight distribution can be appropriately adjusted depending on a polymerization condition at the time of the production of a polyorganosiloxane. In addition, a desired molecular weight distribution can be obtained by fractionating only part of existing polyorganosiloxanes through means such as various kinds of separation.

In a further different embodiment of the present invention, a production method of a polycarbonate-polyorganosiloxane (hereinafter sometimes abbreviated as "PC-POS") copolymer is provided, wherein the said production method is characterized by that the above polyorganosiloxane is used as the raw material thereof.

A known production method such as an interfacial polymerization method (phosgene method), a pyridine method, or an ester exchange method can be employed as a method of producing the PC-POS copolymer. Particularly in the case of the interfacial polymerization method, the step of separating an organic phase containing the PC-POS copolymer and an aqueous phase containing an unreacted substance, a catalyst residue, or the like becomes easy, and hence the separation of the organic phase containing the PC-POS copolymer and the aqueous phase in each washing step based on alkali washing, acid washing, and pure water washing becomes easy, so that the PC-POS copolymer can be efficiently obtained with this method.

The method of producing the PC-POS copolymer is not particularly limited and the copolymer can be produced with reference to a known method of producing the PC-POS copolymer such as a method described in JP 2010-241943 A.

Specifically, the PC-POS copolymer can be produced by: dissolving an aromatic polycarbonate oligomer produced in advance and the polyorganosiloxane in a water-insoluble organic solvent (such as methylene chloride); adding an alkaline aqueous solution (such as an aqueous sodium hydroxide) of a dihydric phenol (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol such as p-t-butylphenol). In addition, the PC-POS copolymer can be produced by copolymerizing a polyorganosiloxane, a dihydric phenol, and phosgene, a carbonate ester, or a chloroformate.

As to the raw material polyorganosiloxane, as described above, the polyorganosiloxane having the following characteristics is used: the polyorganosiloxane has a value obtained by integrating dw/d log(M) from $2.5 \le \log(M) \le 3.1$ is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

In addition, the raw material polyorganosiloxane can have a maximum value when the dw/d log (M) value falls within the range of $3.3 \le \log(M) \le 3.9$; and the average chain length, specific general formula of the polyorganosiloxane, specific examples thereof, and the production method thereof are the same as those described above.

The polycarbonate oligomer can be produced through a reaction of a dihydric phenol and a carbonate precursor such as phosgene or triphosgene in an organic solvent such as methylene chloride, chlorobenzene, or chloroform. It should be noted that when the polycarbonate oligomer is produced by using an ester exchange method, the oligomer can also be produced through a reaction of a dihydric phenol and a carbonate precursor such as diphenyl carbonate.

A dihydric phenol represented by the following general formula (a) is preferably used as the dihydric phenol.

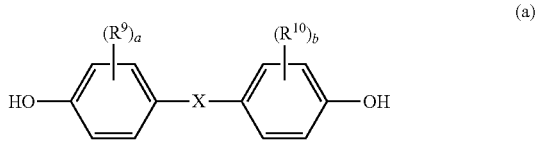

(a)

wherein $R^9$ and $R^{10}$ each independently represents a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; and a and b each independently represents an integer of 0 to 4.

In the formula (a), examples of the halogen atom independently represented by $R^9$ and $R^{10}$ each include a fluorine atom, a chlorine atom, a bromine atom, and an iodine atom. Examples of the alkyl group independently represented by $R^9$ and $R^{10}$ each include a methyl group, an ethyl group, a n-propyl group, an isopropyl group, various butyl groups, various pentyl groups, and various hexyl groups. Examples of the alkoxy group independently represented by $R^9$ and $R^{10}$ each include an alkoxy group whose alkyl moiety is the alkyl group described before.

Examples of the alkylene group represented by X include a methylene group, an ethylene group, a trimethylene group, a tetramethylene group, and a hexamethylene group, wherein an alkylene group having 1 to 6 carbon atoms is preferable. Examples of the alkylidene group represented by X include an ethylidene group and an isopropylidene group. Examples of the cycloalkylene group represented by X include a cyclopentanediyl group, cyclohexanediyl group, and a cyclooctanediyl group, wherein a cycloalkylene group having 5 to 10 carbon atoms is preferable. Examples of the cycloalkylidene group represented by X include a cyclohexylidene group, 3,5,5-trimethylcyclohexylidene group, and a 2-admantylidene group, wherein a cyclohexylidene group having 5 to 10 carbon atoms is preferable, while a cyclohexylidene group having 5 to 8 carbon atoms is more preferable. Examples of the aryl moiety of the arylalkylene group represented by X include an aryl group having 6 to 14 ring-forming carbon atoms, such as a phenyl group, a naphthyl group, a biphenyl group, and an anthoryl group. Examples of the aryl moiety of the arylalkylidene group represented by X include an aryl group having 6 to 14 ring-forming carbon atoms, such as a phenyl group, a naphthyl group, a biphenyl group, and an anthoryl group.

In the formula, a and b each independently represent an integer of 0 to 4, preferably 0 to 2, while more preferably 0 or 1.

Among them, the one in which a and b are zero and X is a single bond or an alkylene group having 1 to 8 carbons, or the one in which a and b are zero and X is an alkylene group having 3 carbon atoms, especially an isopropylidene group, is preferable.

Examples of the dihydric phenol represented by the general formula (a) include bis(hydroxyphenyl)alkane such as 2,2-bis(4-hydroxyphenyl) propane [bisphenol A], bis(4-hydroxyphenyl) methane, 1,1-bis(4-hydroxyphenyl) ethane, and 2,2-bis(4-hydroxy-3,5-dimethylphenyl) propane; 4,4'-dihydroxydiphenyl, a bis(4-hydroxyphenyl)cycloalkane, bis (4-hydroxyphenyl) oxide, bis(4-hydroxyphenyl) sulfide, bis (4-hydroxyphenyl) sulfone, bis(4-hydroxyphenyl) sulfoxide, and bis(4-hydroxyphenyl) ketone. One of those dihydric phenols may be used alone, or two or more thereof may be used as a mixture.

Among them, bis(hydroxyphenyl)alkane-based dihydric phenols are preferable, while bisphenol A is more preferable. When bisphenol A is used as the dihydric phenol, the PC-POS copolymer in which X represents an isopropylidene group and a relationship of a=b=0 is satisfied in the general formula (a) is obtained.

Examples of the dihydric phenol other than bisphenol A include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. One of those dihydric phenols may be used alone, or two or more thereof may be used as a mixture.

Examples of the bis(hydroxyaryl)alkane include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ether include 4,4'-dihydroxydiphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl)fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the abovementioned dihydric phenol include 4,4'-[1,3-phenylenebis (1-methylethylidene)]bisphenol, 10,10-bis(4-hydroxyphenyl)-9-anthrone, and 1,5-bis(4-hydroxyphenylthio)-2,3-dioxapentane.

In the method of producing the PC-POS copolymer, in order to control the molecular weight of the PC-POS copolymer to be obtained, a molecular weight modifier (terminal stopper) can be used. Examples of the molecular weight controller may include monohydric phenols such as phenol, p-cresol, p-tert-butylphenol, p-tert-octylphenol, p-cumylphenol, p-nonylphenol, m-pentadecylphenol, and p-tert-amylphenol. One of those monohydric phenols may be used alone, or two or more thereof may be used in combination.

By using the molecular weight modifier or the like, the PC-POS copolymer may be produced in such a way that the viscosity-average molecular weight having an intended molecular weight may be appropriately obtained in accordance with the use and good thereof.

After the completion of the interfacial polycondensation, the liquid is appropriately left at rest to be separated into an aqueous phase and an organic solvent phase [separating step], the organic solvent phase is washed (preferably washed with a basic aqueous solution, an acidic aqueous solution, and water in order) [washing step], and the resultant organic phase is concentrated [concentrating step], and dried [drying step]. Thus, the PC-POS copolymer can be obtained.

The present invention relates to a polycarbonate-polyorganosiloxane copolymer, comprising: a polycarbonate block (A) comprising a repeating unit represented by the following general formula (I); and a polyorganosiloxane block (B) comprising a repeating unit represented by the following general formula (II), wherein the polyorganosiloxane block (B) has a value obtained by integrating dw/d log(M) from $2.5 \leq \log(M) \leq 3.1$ is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight.

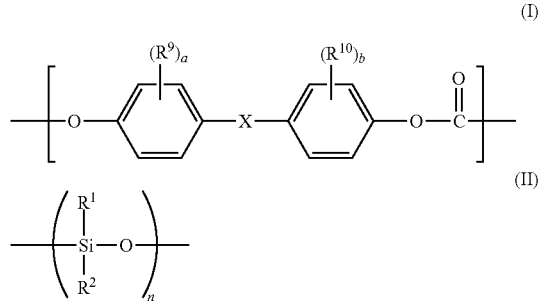

In the general formula (I), $R^9$, $R^{10}$, X, a, and b represent the same meanings as described before. $R^1$ and $R^2$ in the general formula (II) represent the same meanings as described before, and the same is applied to the preferable ranges thereof.

In the polyorganosiloxane block of the PC-POS copolymer of the present invention, in the differential molecular weight distribution curve, the value obtained by integrating dw/d log(M) from $2.5 \leq \log(M) \leq 3.1$ is 0 to 10%, and preferably 0 to 9% of a value obtained by integrating dw/d log(M) over the entire range of log (M) in a differential molecular weight distribution curve. When the ratio becomes more than 10%, yellowness of the polyorganosiloxane tends to increase, so that yellowness of the PC-POS copolymer tends, as a whole, to increase as well.

It should be noted that the differential molecular weight distribution curve of the polyorganosiloxane block in the PC-POS copolymer can be confirmed by the above measurement using the gel permeation chromatograph method using a calibration standard of polystyrene wherein the measurement is carried out after the polyorganosiloxane is extracted, the polyorganosiloxane being obtained by decomposing the PC-POS copolymer with an aqueous solution of a strongly basic solution such as a methanol solution of sodium hydroxide. As to the GPC apparatus to obtain measurement values of the molecular weight and molecular weight distribution of the polyorganosiloxane, the apparatus mentioned before can be used.

In the polyorganosiloxane block in the PC-POS copolymer of the present invention, the dw/d log(M) value can have a maximum value in the range of $3.3 \leq \log(M) \leq 3.9$. If the log(M) at the time when the dw/d log(M) value has a maximum value in the differential molecular weight distribution curve is less than 3.3, a poor result is obtained in the low-temperature impact resistance of the PC-POS copolymer, and if the log(M) becomes more than 3.9, transparency of the PC-POS copolymer tends to decrease.

In the polyorganosiloxane block (II) in the PC-POS copolymer of the present invention, the average chain length n is preferably in the range of 20 to 50, more preferably in the range of 30 to 45, while still more preferably in the range of 35 to 45. The average chain length can be calculated from measurement of a nuclear magnetic resonance (NMR). If the average chain length n is 20 or more, a sufficient impact strength at low temperature can be obtained, and if the average chain length n is 50 or less, the copolymer having excellent transparency can be obtained.

In the present invention, content of the polyorganosiloxane block (B) shown by the general formula (II) in the PC-POS copolymer is preferably in the range of 0.5 to 20% by mass, while more preferably in the range of 0.5 to 10% by mass. The content of the polyorganosiloxane block (B) in the PC-POS copolymer is the value calculated from measurement of a nuclear magnetic resonance (NMR).

If the content of the polyorganosiloxane block (B) is less than 0.5% by mass, not only an impact strength at low temperature (about −20° C.) decreases but also an Izod impact strength tends to decrease, so that it is not suitable. On the other hand, if the content of the polyorganosiloxane block (B) becomes more than 20% by mass, an impact resistance at normal temperature (about 23° C.) decreases.

The viscosity-average molecular weight of the PC-POS copolymer of the present invention is usually in the range of 12,000 to 40,000, while preferably in the range of 13,000 to 30,000. If the viscosity-average molecular weight is less than 12,000, a molded article produced by using the PC-POS copolymer of the present invention cannot have a sufficient strength. On the other hand, if the viscosity-average molecular weight becomes more than 40,000, viscosity of the copolymer increases, so that the temperature at the time of injection molding or extrusion molding needs to be raised thereby tending to readily decrease the transparency thereof due to thermal deterioration.

The viscosity of the PC-POS copolymer can be decreased also by raising the molding temperature thereof. In that case, however, its molding cycle becomes longer to result in poor economical efficiency. Moreover, if the temperature is excessively raised, the transparency tends to decrease due to thermal deterioration of the PC-POS copolymer.

It should be noted that the viscosity-average molecular weight (Mv) is a value calculated from Schnell's equation ($[\eta]=1.23\times10^{-5}\times Mv^{0.83}$) by measuring the limiting viscosity [η] of its methylene chloride solution at 20° C.

In the PC-POS copolymer of the present invention, various known additives can be blended into the polycarbonate resin composition as required. Examples of the additives include a reinforcing material, a stabilizer, an antioxidant, a UV absorber, an antistatic agent, a lubricant, a release agent, a dye, and a pigment as well as a flame retardant.

The PC-POS copolymer of the present invention can be blended with any known additive as required, and kneaded to obtain the PC resin composition.

The blending and the kneading can be performed by generally used methods, for example, methods each using a ribbon blender, a Henschel mixer, a Banbury mixer, a drum tumbler, a single-screw extruder, a twin-screw extruder, a Ko-Kneader, a multi-screw extruder, and the like.

It should be noted that the heating temperature in the kneading is generally selected from the range of 250 to 320° C.

The present invention relates also to a molded article obtained by molding the above-mentioned PC-POS copolymer.

Various conventionally known molding methods, for example, an injection molding method, an injection compression molding method, an extrusion molding method, a blow molding method, a press molding method, a vacuum molding method, and a foam molding method can be used for molding the resultant PC resin composition. Among them, injection molding with a mold temperature of 60° C. or higher, preferably 80 to 120° C. is preferred.

In this case, the injection molding is performed at a resin temperature of generally about 280 to 360° C., while preferably 280 to 330° C.

The molded article of the present invention can be used in housings for a cellular phone, a smart phone, a mobile personal computer, a tablet, a portable remote terminal, and the like; an illumination cover and a construction material; in housings for electronic equipment which require visibility, such as, a digital camera, and a video camera; in protective equipment such as a police shield, a helmet visor, and a sport protective equipment, and in other commodities.

EXAMPLES

The present invention is more specifically described by way of Examples. However, the present invention is by no means limited by these Examples. In each of Examples, characteristic values and evaluation results were determined in the following manners.

(1) Gel Permeation Chromatography (GPC)

The GPC measurement of the polyorganosiloxane was carried out under the following conditions.

Test apparatus: TOSOH HLC 8220
Measurement condition: TOSOH TSK-GEL GHXL-L, G4000HXL, G2000HXL
Solvent: tetrahydrofuran (THF)
Column temperature: 40° C.
Flow rate: 1.0 mL/min
Detector: RI
Injection concentration: 0.2 w/v %
Injection amount: 0.1 mL
Standard polystyrene manufactured by Tosoh Corporation was used to obtain a calibration curve.

The molecular weight distribution of a polyorganosiloxane in a polycarbonate-polydimethylsiloxane (PC-PDMS) was measured as described below. 3.9 g of obtained PC-PDMS copolymer flake was added to methylene chloride so as to obtain a 10% by mass solution of the copolymer, and the flake was completely dissolved. While the copolymer solution was stirred with a magnetic stirrer, 30 mL of a mixed aqueous solution obtained from a 48% by mass aqueous solution of sodium hydroxide and methanol with the mixing ratio of 1:9 (volume ratio) was added to the copolymer solution, and the resultant mixture was stirred for 3 hours. After that, 30 mL of methylene chloride was added further to the mixture, and then the precipitated crystal (main component: bisphenol A) was filtered with a pleated filter paper, followed by the washing of the crystal with methylene chloride. The methylene chloride solution of filtrate was washed with 15% by vol of a 0.03 mol/L aqueous NaOH twice. After that, the solution was washed with 15% by vol of a 0.2 N HCl and then washed with 15% by vol of pure water. The resultant methylene chloride solution was dried with a dryer and the resultant viscous liquid (main component: PDMS) was subjected to measurement by GPC. It was confirmed that the liquid had the same molecular weight distribution as that of the used polyorganosiloxane.

A differential molecular weight distribution curve can be obtained by such method as described below. First, the time curve of an intensity distribution detected with a RI detector (elution curve) was converted into a molecular weight distribution curve with respect to the logarithmic value of a molecular weight (log (M)) by using a calibration curve. Next, an integral molecular weight distribution curve with respect to the log(M) when the total area of the distribution curve was set to 100% was obtained. After that, a differential molecular weight distribution curve with respect to the log(M) can be obtained by differentiating the integral molecular weight distribution curve with respect to the log(M). It should be noted that a series of operations up to the acquisition of the differential molecular weight distribution curve can be typically performed with analysis software built in the GPC measuring apparatus.

(2) Polydimethylsiloxane Content

The content of the polydimethylsiloxane was calculated by NMR measurement from the integrated value ratio of a methyl group of the polydimethylsiloxane.

(3) Viscosity-Average Molecular Weight of Polycarbonate-Polyorganosiloxane Copolymer A viscosity-average molecular weight (Mv) was calculated from the following equation (Schnell's equation) by using a limiting viscosity [η] determined through the measurement of the viscosity of the methylene chloride solution at 20° C. with an Ubbelohde-type viscometer.

$$[\eta]=1.23\times10^{-5}\times Mv^{0.83}$$

<Polycarbonate Oligomer>

As the raw material polycarbonate oligomer, a methylene chloride solution of the polycarbonate oligomer with the concentration thereof being 318 g/L, the concentration of the chloroformate group being 0.75 mol/L, the weight-average molecular weight (Mw) being 3,100, and the mole fraction of the terminal groups obtained from NMR being p-t-butylphenol (PTBP):OH:chloroformate (CF)=3.3:7.7:89.0 was used.

The weight-average molecular weight (Mw) was measured as the molecular weight relative to the standard polystyrene (weight-average molecular weight: Mw) with GPC [column: TOSOH TSK-GEL MULTIPORE HXL-M (two columns)+Shodex KF801 (one column), temperature: 40° C., flow rate: 1.0 mL/min, and detector: RI] using tetrahydrofuran as a developing solution.

Example 1

The polycarbonate oligomer raw material solution produced as described above (15 L), 8.3 L of methylene chloride, 393 g of an allylphenol terminal-modified polydimethylsiloxane (PDMS) [having an average chain length n of 36, a ratio of a value obtained by integrating a dw/d log(M) value over the log(M) range of from 2.5 to 3.1 to a value obtained by integrating a dw/d log(M) over the entire range of the log(M) (hereinafter, in Examples, this is sometimes referred to as "ratio of a log(M) of from 2.5 to 3.1") of 7.6%, and a log(M) at which dw/d log(M) became maximum of 3.6], and 5.8 mL of triethylamine were charged into a 50-L vessel-type reactor provided with a baffle board, a paddle-type stirring blade, and a cooling jacket; and then, 1,496 g of a 6.4% by mass aqueous sodium hydroxide was added to the mixture under stirring, and the polycarbonate oligomer and the allylphenol terminal-modified PDMS were caused to react with each other for 10 minutes.

To the polymerization solution thus obtained were added a solution of p-t-butylphenol (PTBP) in methylene chloride (prepared by dissolving 70 g of PTBP in 2.0 L of methylene chloride) and a solution of BPA in aqueous sodium hydroxide (prepared by dissolving 1,099 g of BPA in an aqueous solution prepared by dissolving 648 g of NaOH and 2.0 g of sodium dithionite in 9.5 L of water), and the mixture thus obtained was subjected to a polymerization reaction for 50 minutes.

To the resultant was added 10 L of methylene chloride for dilution, and then the resultant mixture was stirred for 10 minutes. After that, the mixture was separated into an organic phase containing the polycarbonate, and an aqueous phase containing excess amounts of BPA and NaOH; and the organic phase was isolated.

A solution of a PC-PDMS in methylene chloride thus obtained was sequentially washed with a 0.03 mol/L aqueous NaOH and a 0.2 N hydrochloric acid in amounts of 15% by vol each relative to the solution. Next, the solution was repeatedly washed with pure water until an electric conductivity in the aqueous phase after the washing became 1 mS/m or less.

A solution of the polycarbonate in methylene chloride obtained by the washing was concentrated and pulverized, and the resultant flake was dried under reduced pressure at 120° C. The flake had a PDMS amount of 6.0% by mass, a viscosity number measured in conformity with ISO 1628-4 (1999) of 46.9, and a viscosity-average molecular weight Mv of 17,400.

100 parts by mass of the resultant PC-PDMS copolymer flake and 0.1 part by mass of IRGAFOS 168 (trade name, manufactured by BASF GmbH) as an antioxidant were mixed. The mixture was supplied to a vented single screw extruder, and was melt-kneaded at a resin temperature of 280° C. to provide a pellet sample for an evaluation. The pellet sample for an evaluation was dried at 120° C. for 8 hours, and was then subjected to injection molding with an injection molding machine at a molding resin temperature of 280° C. and a die temperature of 80° C. to produce a test piece for performing each test, followed by the performance of the following tests.

It is confirmed that the PDMS had the same molecular weight distribution as that of the used PDMS by the GPC measurement of the PDMS in the PC-PDMS.

(1) Tensile Characteristics: Rupture Strength and Rupture Elongation

By using the test piece having the thickness of 3.2 mm obtained in Example 1, the rupture strength and the rupture elongation were measured under the condition of 50 mm/min in conformity with ASTM D638. It is shown that the tensile characteristics are better when these values are larger.

(2) Flexural Characteristics: Flexural Strength and Flexural Modulus

By using the test piece having the thickness of 4.0 mm obtained in Example 1, the flexural strength and the flexural modulus were measured under the condition of 2 mm/min in conformity with ISO 178. It is shown that the flexural characteristics are better when these values are larger.

(3) Heat Distortion Temperature (HDT)

By using the test piece having the thickness of 3.2 mm obtained in Example 1, the heat distortion temperature was measured under the load of 1.83 MPa in conformity with ASTM D648.

(4) Total Light Transmittance and Haze Value

By using the test piece having the thickness of 2 mm, the total light transmittance was measured on the basis of ISO 13468 three times, the haze value was measured on the basis of ISO 14782 three times, and their respective averages were determined. The results are shown in Table 1.

(5) Measurement of YI Value

By using the test piece having the thickness of 2 mm, the YI value was measured under the conditions of illuminant C and 2-degree observer angle by using the spectrophotometer "U-4100" (manufactured by Hitachi High-Technologies Corp.)

(6) Izod Impact Strength

By using the test piece having the thickness of 3.2 mm (about ⅛ inch) produced with an injection molding machine, the notched Izod impact strength was measured at measurement temperatures of 23° C. and −20° C. in conformity with ASTM Standard D-256. The results are shown in Table 1.

In addition, for each of Examples 2 to 3 to be described later, the test piece was similarly produced by using the PC-PDMS copolymer flake obtained in each of Examples, and the above-mentioned items of (1) to (5) were measured. The results are shown together in Table 1.

Example 2

The same procedure as that of Example 1 was repeated except that the allylphenol terminal-modified PDMS used in Example 1 was changed to the allylphenol terminal-modified PDMS [having an average chain length n of 40, the ratio of a log (M) of from 2.5 to 3.1 of 7.2%, and a log (M) at which dw/d log(M) became maximum of 3.6]. The flake thus obtained had a PDMS amount of 6.0% by mass, a viscosity number measured in conformity with ISO 1628-4 (1999) of 46.2, and a viscosity-average molecular weight Mv of 17,100.

Comparative Example 1

The same procedure as that of Example 1 was repeated except that the allylphenol terminal-modified PDMS used in Example 1 was changed to the allylphenol terminal-modified PDMS having an average chain length n of 37.1, the ratio of a log (M) of from 2.5 to 3.1 of 14.8%, and a log (M) at which dw/d log(M) became maximum of 3.6. The flake thus obtained had a PDMS amount of 6.0% by mass, a viscosity number measured in conformity with ISO 1628-4 (1999) of 47.4, and a viscosity-average molecular weight Mv of 17,700. In addition, by using the flake of the obtained PC-PDMS copolymer, the test pieces were prepared in the same way as Example 1; and the items of (1) to (5) were measured in the same way as Example 1. The results are shown together in Table 1. In addition, for Comparative Example 2 to be described later, the test piece was prepared in the same way as Example 1 by using the PC-PDMS copolymer flake, and the items of (1) to (5) were measured. The results are shown together in Table 1.

Comparative Example 2

The same procedure as that of Comparative Example 1 was repeated except that the allylphenol terminal-modified PDMS used in Comparative Example 1 was changed to the allylphenol terminal-modified PDMS having an average chain length n of 40, the ratio of a log(M) of from 2.5 to 3.1 of 14.6%, and a log(M) at which dw/d log(M) became maximum of 3.7. The flake thus obtained had a PDMS amount of 6.0% by mass, a viscosity number measured in conformity with ISO 1628-4 (1999) of 47.3, and a viscosity-average molecular weight Mv of 17,600.

in which the value obtained by integrating a dw/d log(M) value in the range of 2.5≤log(M)≤3.1 is more than 10% of a value obtained by integrating dw/d log(M) over the entire range of log (M) in a differential molecular weight distribution curve, it can be seen that the curve in the range of 2.5≤log(M)≤3.1 rises slowly.

INDUSTRIAL APPLICABILITY

According to the present invention, a polycarbonate-polyorganosiloxane copolymer which has excellent transparency and low yellowness can be obtained without deteriorating mechanical strength by controlling the molecular weight distribution of a polyorganosiloxane as well as controlling the chain length distribution of the polyorganosiloxane in the polycarbonate-polyorganosiloxane copolymer.

TABLE 1

|  |  | Example 1 | Example 2 | Comparative Example 1 | Comparative Example 2 |
|---|---|---|---|---|---|
| <PDMS> |  |  |  |  |  |
| Average chain length (n) |  | 36 | 40 | 37 | 40 |
| Ratio of 2.5 ≤ log(M) ≤ 3.1 | % | 7.6 | 7.2 | 14.8 | 14.6 |
| Log(M) giving maximum dw/dlog(M) |  | 3.6 | 3.6 | 3.6 | 3.7 |
| <PC-PDMS> |  |  |  |  |  |
| Content of PDMS | % by mass | 6.0 | 6.0 | 6.0 | 6.0 |
| Viscosity number |  | 46.9 | 46.2 | 47.4 | 47.3 |
| Viscosity-average molecular weight (Mv) |  | 17,400 | 17,100 | 17,700 | 17,600 |
| Rupture strength | (MPa) | 62 | 63 | 61 | 60 |
| Rupture elongation | (%) | 95 | 100 | 97 | 95 |
| Flexural strength | (MPa) | 86 | 86 | 83 | 84 |
| Flexural modulus | (MPa) | 2,200 | 2,230 | 2,160 | 2,170 |
| Heat distortion temperature (° C.) | (1.83 MPa) | 123 | 123 | 120 | 120 |
| Total light transmittance | (%) | 89.4 | 89.4 | 89.3 | 89.2 |
| Haze value | (%) | 0.6 | 0.4 | 0.6 | 0.6 |
| YI |  | 3.1 | 3.2 | 3.8 | 3.9 |
| Izod impact strength @ 23° C. | (KJ/m2) | 77 | 74 | 75 | 75 |
| Izod impact strength @ −20° C. | (KJ/m$^2$) | 62 | 65 | 64 | 66 |

As is apparent from the table, in Example 1 and Example 2 in which the PDMS that a component having a log(M) of from 2.5 to 3.1 is present at 10% or less of the entirety of the PDMS in the molecular weight distribution of the PDMS is used, the effects that transparency is enhanced and yellowness (YI) is decreased can be obtained without deteriorating the mechanical properties. On the other hand, in Comparative Example 1 and Comparative Example 2 in which the PDMS that a component having a log(M) of from 2.5 to 3.1 is present at more than 10% of the entirety of the PDMS is used, the yellownesses (YI) thereof are significantly higher than the YI values of Examples, and therefore, it can be seen that the yellowness has not been improved therein.

FIG. 1 is the graph showing the differential distribution curves obtained in Example 1 and Comparative Example 1. In Example 1 in which the value obtained by integrating a dw/d log(M) value in the range of 2.5≤log(M)≤3.1 is 0 to 10% of a value obtained by integrating dw/d log(M) over the entire range of log (M) in a differential molecular weight distribution curve, the curve in the range of 2.5≤log(M)≤3.1 rises sharply. On the other hand, in Comparative Example 1

The invention claimed is:

1. A polycarbonate-polyorganosiloxane copolymer, comprising:

a polycarbonate block (A) comprising a repeating unit represented by the following general formula (I); and a polyorganosiloxane block (B) comprising a repeating unit represented by the following general formula (II), wherein the polyorganosiloxane block (B) has a value obtained by integrating dw/d log(M) from 2.5≤log(M) ≤3.1 is 0 to 10% of a value obtained by integrating dw/d log(M) over the entire range of log (M) in a differential molecular weight distribution curve, wherein the differential molecular weight distribution curve is determined by gel permeation chromatography using the polystyrene calibration curve, has an x-axis showing a logarithmic value log(M) of a molecular weight M and has a y-axis showing dw/d log(M) obtained by differentiating a concentration fraction w with respect to the logarithmic value log(M) of the molecular weight:

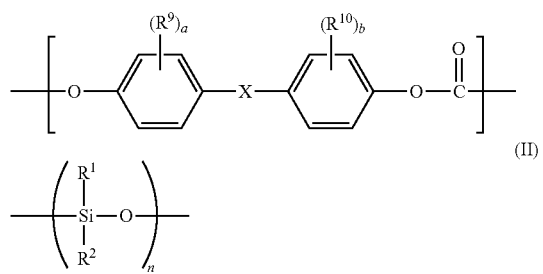

wherein, $R^9$ and $R^{10}$ each independently represents a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; a and b each independently represents an integer of 0 to 4; $R^1$ and $R^2$ each independently represents a hydrogen atom, a halogen atom, an alkyl group having 1 to 6 carbon atoms, an alkoxy group having 1 to 6 carbon atoms, or an aryl group having 6 to 12 carbon atoms; an average repeat number n in the range of 30 to 50 represents a sum of siloxane repeating units in the polyorganosiloxane block.

2. The polycarbonate-polyorganosiloxane copolymer according to claim 1, wherein the dw/d log(M) value becomes maximum in the range of 3.3≤log(M)≤3.9 in the differential molecular weight distribution curve of the polyorganosiloxane block (B).

3. The polycarbonate-polyorganosiloxane copolymer according to claim 1, wherein content of the polyorganosiloxane block (B) in the polycarbonate-polyorganosiloxane copolymer is in the range of 0.5 to 20% by mass.

4. The polycarbonate-polyorganosiloxane copolymer according to claim 1, wherein a viscosity-average molecular weight thereof is in the range of 12,000 to 40,000.

5. A molded article, which is obtained by molding the polycarbonate-polyorganosiloxane copolymer according to claim 1.

* * * * *